US 12,450,372 B2

(12) United States Patent
Bishop et al.

(10) Patent No.: US 12,450,372 B2
(45) Date of Patent: Oct. 21, 2025

(54) HOST-BASED HARDWARE ENCRYPTION SYSTEM

(71) Applicant: T-Mobile USA, Inc., Bellevue, WA (US)

(72) Inventors: Michael Bishop, Issaquah, WA (US); Shawn David Corey, Kenmore, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 168 days.

(21) Appl. No.: 16/949,059

(22) Filed: Oct. 12, 2020

(65) Prior Publication Data

US 2022/0114268 A1   Apr. 14, 2022

(51) Int. Cl.
G06F 21/60 (2013.01)
G06F 13/362 (2006.01)
G06F 21/31 (2013.01)
G06F 21/78 (2013.01)

(52) U.S. Cl.
CPC .......... *G06F 21/606* (2013.01); *G06F 13/362* (2013.01); *G06F 21/31* (2013.01); *G06F 21/602* (2013.01); *G06F 21/604* (2013.01); *G06F 21/78* (2013.01)

(58) Field of Classification Search
CPC ...... G06F 21/606; G06F 13/362; G06F 21/31; G06F 21/602; G06F 21/604; G06F 21/78
See application file for complete search history.

(56) References Cited

U.S. PATENT DOCUMENTS

| | | | | |
|---|---|---|---|---|
| 5,915,025 A | * | 6/1999 | Taguchi | G06F 12/145 |
| | | | | 380/46 |
| 6,236,728 B1 | * | 5/2001 | Marchant | G06F 21/85 |
| | | | | 713/184 |
| 8,543,838 B1 | * | 9/2013 | Au | G06F 21/602 |
| | | | | 713/190 |
| 10,860,086 B2 | * | 12/2020 | White | H04L 9/088 |
| 11,392,714 B1 | * | 7/2022 | Matthews | H04L 9/0894 |
| 2005/0125678 A1 | * | 6/2005 | Shaw | G16H 10/65 |
| | | | | 713/185 |

(Continued)

FOREIGN PATENT DOCUMENTS

EP   2136310 A1 * 12/2009 ............ G06F 21/85
WO   WO-2018005361 A1 * 1/2018 ......... H04L 67/1044

OTHER PUBLICATIONS

"Random Seed", Apr. 14, 2016, Wikipedia (Year: 2016).*

*Primary Examiner* — Lynn D Feild
*Assistant Examiner* — Ethan V Vo
(74) *Attorney, Agent, or Firm* — Lee & Hayes, P.C.

(57) ABSTRACT

Systems and methods for encrypting and decrypting data sent to and received from a peripheral device physically coupled to a hardware interface of a user equipment. In some examples, the user equipment may include an encrypting/decryption component that is configured to physically between a hardware interface of the user equipment and the other components of the user equipment. The encrypting/decryption component may be configured to receive a plurality of encryption/decryption schemes from a remote system. The encrypting/decryption component may select and apply one or more of the plurality of encryption/decryption schemes to data being downloaded and/or uploaded to the peripheral device.

19 Claims, 5 Drawing Sheets

(56) References Cited

U.S. PATENT DOCUMENTS

| | | | |
|---|---|---|---|
| 2009/0150970 A1* | 6/2009 | Hinds | G06F 21/88 |
| | | | 726/1 |
| 2009/0296941 A1* | 12/2009 | Devanand | H04L 63/0428 |
| | | | 380/281 |
| 2010/0031056 A1* | 2/2010 | Harada | G06F 21/78 |
| | | | 713/193 |
| 2011/0225428 A1* | 9/2011 | Stufflebeam, Jr. | G06F 21/78 |
| | | | 713/189 |
| 2012/0144210 A1* | 6/2012 | Yacobi | H04L 9/088 |
| | | | 713/193 |
| 2012/0260089 A1* | 10/2012 | Gupta | H04L 9/0863 |
| | | | 713/150 |
| 2013/0179694 A1* | 7/2013 | Geoffrey | G06F 21/6209 |
| | | | 713/189 |
| 2016/0182462 A1* | 6/2016 | Vaquero Gonzalez | |
| | | | G06F 17/00 |
| | | | 713/171 |
| 2017/0230419 A1* | 8/2017 | Prafullchandra | G06F 21/604 |
| 2017/0251022 A1* | 8/2017 | White | G06F 1/3296 |
| 2018/0248887 A1* | 8/2018 | Sayed | H04L 63/105 |
| 2018/0330123 A1* | 11/2018 | Colombo | G06F 12/0292 |
| 2019/0362068 A1* | 11/2019 | Wang | H04L 9/50 |
| 2020/0387518 A1* | 12/2020 | Kesarwani | G06F 21/602 |
| 2021/0281404 A1* | 9/2021 | Kampanakis | H04L 63/205 |
| 2022/0078194 A1* | 3/2022 | Grover | H04L 63/0457 |
| 2023/0237183 A1* | 7/2023 | Torfs | G06F 21/6218 |
| | | | 713/193 |

* cited by examiner

HOST-BASED HARDWARE ENCRYPTION SYSTEM

BACKGROUND

One of the most common vulnerabilities of a company's confidential information is the downloading of documents and data via a direct or hardware connection between a peripheral and a networked computing device. Often, employees and staff utilize personal portable peripheral devices ("peripherals") with regards to both personal devices and company devices. In some cases, sensitive data and documents may be downloaded onto the peripheral device while the employee has the peripheral electronically coupled to a corporate computing device. In some cases, the peripheral may become lost or stolen resulting in sensitive company data and documents being accessible to the public.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
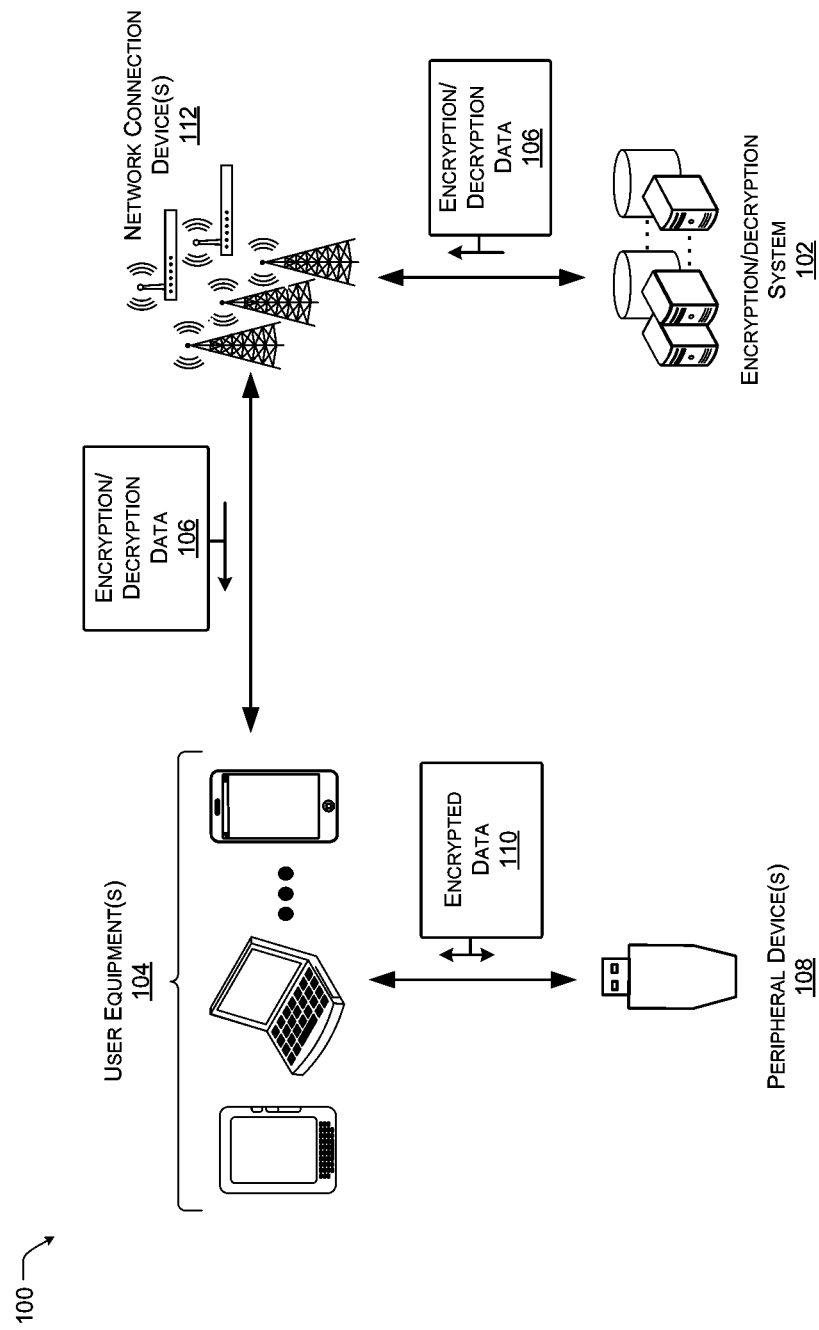
FIG. 1 is an example of a network implementation of an encryption/decryption system and user equipment equipped with an encryption/decryption component, in accordance with some examples of the present disclosure.

Discussed herein are systems, components, and methods associated with preventing unauthorized downloading of sensitive or confidential data and documents of a company onto authorized peripheral devices. In some implementations, an encryption component or circuit may be introduced into the hardware of a computing device between an external hardware interface (e.g., universal serial bus (USB), mini USB, High-Definition Multimedia Interface (HDMI), and the like) and other components (e.g., processors, memories, sensors, etc.) of the host computing device.

The encryption component may be configured to receive, via a wired or wireless communication channel, encryption data from a central encryption system. In some cases, the encryption system may transmit or provide the encryption/decryption data via a company network when the computing devices including the encryption component are connected. The encryption/decryption component may store the encryption/decryption data in an associated memory. In some cases, the encryption/decryption data may include, for example, encryption and/or decryption keys, codes, seed values, algorithms and the like for use in encrypting and decrypting data and documents downloaded to or uploaded from the peripheral devices.

From time to time, the encryption system may update or edit the encryption/decryption data (e.g., the encryption and/or decryption keys, codes, seed values, algorithms, etc.) stored on each of the computing devices. For instance, the encryption system may be configured to update the encryption/decryption data on the computing devices and/or the encryption/decryption data on the peripherals when the computing device is coupled to the company network and/or the peripheral is coupled to a company computing device. For example, the encryption system may be able to delete encrypted data associated with specific users, such as when the user is terminated from employment, when the peripheral is next connected to the network.

In some cases, the encryption/decryption data may be specific to devices and/or peripherals associated with specific company employees, roles, clearances, and the like. For example, the encryption system may send different encryption/decryption data to different company computing devices (e.g., the devices assigned to the individual employee, the role or department, etc.). In this manner, the encryption system and company may control and/or prevent encrypted data from being passed between employees and departments without the proper approval of the company's information technology (IT) departments. For example, a computing recourse assigned to the accounting department may apply a first encryption/decryption technique to data downloaded and a computing resource assigned to the marketing department may apply a second encryption/decryption technique. In this manner, if a peripheral containing financial data encrypted using the first encryption/decryption technique is coupled to a marketing department computing resource, the marketing department computing resource may be unable to decrypt the data stored on the peripheral as the marketing department utilizes the second encryption/decryption technique.

In some cases, the encryption/decryption data may include instructions for the encryption/decryption component to encrypt specific types of documents, specific data or types of data, and the like with different encryption algorithms. For example, financial spread sheets may have a higher level of encryption than marketing materials even if downloaded from the same computing resource. For example, the encryption/decryption data provided to the computing resource may include both the first encryption/decryption technique and the second encryption/decryption technique of the above example. In this manner, any data downloaded to the peripheral that contains, for instance, metadata indicating the data belongs to marketing may use the second encryption/decryption technique while any data downloaded to the peripheral that contains metadata indicating the data belongs to financing may use the first encryption/decryption technique.

The encryption/decryption data may also be specific to a user account or user of the computing resource. For instance, if a first user logs in on the computing resource and downloads data onto a peripheral, the encryption/decryption component may apply a first encryption/decryption technique to the data. However, if a second user logs in on the same computing resource, the encryption/decryption component may apply a second different encryption/decryption technique to the data being downloaded.

In still other implementations, the encryption/decryption data may also be specific to a location of the computing resource. For instance, if the computing resource is at a first location, for instance, in a secured lab, the computing resource may download data onto a peripheral using a first encryption/decryption technique. However, if the computing resource is at a second location, such as at the user's cubicle, the computing resource may apply a second different encryption/decryption technique to the data.

Thus, as discussed herein, the encryption/decryption system and components effectively prevent the user from downloading data onto a peripheral device without the data being properly encrypted. In this manner, the data downloaded by employees, contractors, and the like may only be opened or accessed on approved computing resources, thereby reducing risk that confidential or sensitive corporate data may be stored in an unencrypted manner on, for instance, an employee's personal computing resources. Additionally, the encryption/decryption system and components, discussed herein, effectively removes the encryption responsibility from the end user and places responsibility with an authorized individual via the encryption system.

FIG. 1 is an example of a network implementation 100 of an encryption/decryption system 102 and user equipment 104 equipped with an encryption/decryption component, in accordance with some examples of the present disclosure. In the illustrated example, the encryption/decryption system 102 is in communication with the user equipment 104 to provide the encryption/decryption data 106 usable by the encryption/decryption component of the user equipment 104 to encrypt data downloaded onto a peripheral device, such as peripheral device 108, and to decode data uploaded from the peripheral device 108 onto the user equipment 104. In this manner, any data downloaded from the user equipment 104 is encrypted, generally indicated by encrypted data 110, regardless of the intention of the user of the user equipment 104.

In some cases, the encryption/decryption system 102 may be a central system operated by a company's IT department or other centrally managed system. The encryption/decryption system 102 may be configured to generate, manage, update, or otherwise allow a user/operator to organize and push the encryption/decryption data 106 for use by the encryption/decryption components on the user equipment 104.

In this example, the user equipment 104 may be in communication with the encryption/decryption system 102 via one or more network connection devices 112. For instance, the user equipment 104 may be coupled to a network via one or more wired (e.g., a docking station) or wireless (e.g., router) systems. In general, the network connection devices 112 may be secured via password authentication and the like, such that unauthorized devices are unable to connect or have limited/restricted access. In some implementations, the encryption/decryption system 102 may be able to provision new user equipment 104 and/or send new or updated encryption/decryption data 106 to existing user equipment 104 whenever the user equipment 104 is coupled to the network connection devices 112. In some cases, the encryption/decryption system 102 may be able reset, update, delete, and/or otherwise change the stored encryption/decryption data 106 (e.g., remove decryption keys associated with a terminated employee) via the network associate with the network connection devices 112, thereby preventing data stored on the peripheral devices 108 from being decrypted by even the original encrypting user equipment 104.

In some cases, the encrypted data 110 may be encrypted and decrypted by the user equipment 104 using encrypting/decryption techniques and keys that are specific to a company, a department, a role or class of employee assigned to the user equipment 104 and/or the peripheral device 108, and/or other characteristics of the employee/user and/or the user equipment 104. For example, if the user equipment 104 is a shared resource between users, the user equipment 104 may apply different encrypting/decryption techniques and keys based on the active user of the user equipment 104. In this manner, different users are unable to access encrypted data 110 of other users even when utilizing the same user equipment 104.

In some specific examples, the encrypting/decryption techniques and keys utilized by the user equipment 104 may also be based on a characteristic of the content or data being downloaded or uploaded. For instance, employee or human resource data may be encrypted using a different or a higher level of encryption than a potential customer list. In another example, text-based data may be encrypted/decrypted using techniques and keys that differ from those used on audio-video data.

Figure 2:
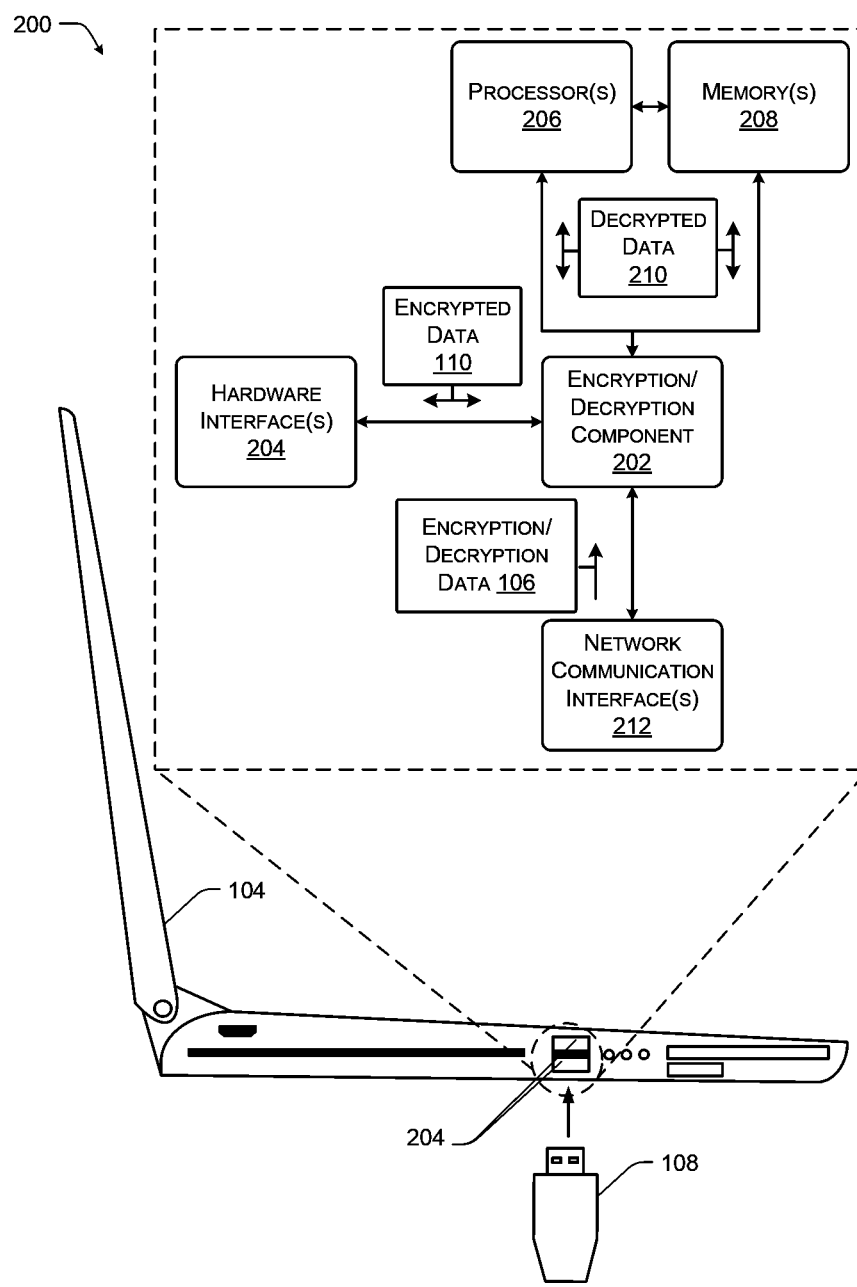
FIG. 2 is an example of an implementation of an encryption/decryption component associated with the encryption/decryption system of FIG. 1, in accordance with some examples of the present disclosure.

FIG. 2 is an example 200 of an implementation of an encryption/decryption component 202 associated with the encryption/decryption system of FIG. 1, in accordance with some examples of the present disclosure. In the current example, a user of a user equipment 104 is coupling a peripheral device 108 to a hardware interface 204, such as a USB interface, of the user equipment 104 as shown. Once coupled, the user equipment 104 may attempt to download encrypted data 110 to and/or upload encrypted data 110 from the peripheral device 108 via the hardware interface 204.

The user equipment 104 may include one or more processors 206 and one or more memories 208 for accessing and storing decrypted data 210. The encryption/decryption component 202 may be configured to receive the decrypted data 206 from either or both of the processors 206 and/or the memories 208 and to encrypt the decrypted data 206 as encrypted data 110. The encrypted data 110 may then be provided to the peripheral device 108 via the hardware interface 204. As discussed above, the encryption/decryption component 202 may encrypt the decrypted data 210 regardless of the intention of a current user of the user equipment 104.

In the illustrated example, the encryption/decryption component 202 may receive encryption/decryption data 106 from the encryption/decryption system via one or more network communication interfaces 212, as discussed above with respect to FIG. 1. In some examples, the encryption/decryption component 202 may store the encryption/decryption component 202 in a memory that is inaccessible to the user of the user equipment 104 to, for instance, prevent tampering with the encryption/decryption data 106. In other examples, the encryption/decryption data 106 may be stored on one or more of the memories 208. The encryption/decryption data 106 may be encoded, compressed, and/or otherwise encrypted itself when stored. In these examples, the encryption/decryption component 202 may be configured to decode, decompress, and/or decrypt the encryption/decryption data 106 when preforming encryption and/or decryption operations on the decrypted data 210 being sent to the peripheral device 108 and/or the encrypted data 110 being received from the peripheral device 108.

In some specific examples, the encryption/decryption component 202 may select the encryption/decryption data 106 (e.g., the technique, algorithm, keys, seed values, etc.) to use in the encrypting the decrypted data 210 being sent to the peripheral device 108 and/or in decrypting the encrypted data 110 received from the peripheral device 108. For example, the encryption/decryption component 202 may select the encryption/decryption data 106 based on characteristics of the current or active user on the user equipment 104, a status of the user equipment 104 (e.g., device categorization by, for instance, the IT department), characteristics and/or features of the data 210 or 110 (e.g., type, content, metadata, etc.), a location of the user equipment 104 (e.g., docket in a secured lab v. at the user's home), and the like.

For instance, the user equipment 104 may have access to more sensitive data, such as via a network or coupled server, when the user equipment 104 is docket in a secured lab or office than when the user equipment 104 is at home. In these cases, the encryption/decryption component 202 may utilize a first encryption technique when the encryption/decryption component 202 determines that the user equipment 104 is in the secured lab and a second encryption technique (different than the first technique) when the user is at home. Likewise, the encryption/decryption component 202 may only be able to decrypt the data encrypted using the first technique when the user equipment 104 is again docked in the secured lab. In this manner, the encryption/decryption component 202 may ensure that sensitive data is only accessed when the user and the user equipment 104 is in a controlled environment.

In another example, the encryption/decryption component 202 may be configured to identify a type of data (e.g., text-based, video, audio, etc.) and/or content (e.g., subject matter, status, sensitivity, etc.) of the data (e.g., financial, marketing, human resource, product development, and the like) and to encrypt/decrypt using different techniques (e.g., algorithms, keys, codes, seed values, etc.) for different types and content of the data. Thus, the encryption/decryption component 202 may utilize a first encryption technique when the encryption/decryption component 202 determines that the data includes content related to financial records and a second encryption technique (different than the first technique) when the encryption/decryption component 202 determines that the data includes content related to product development.

Figure 3:
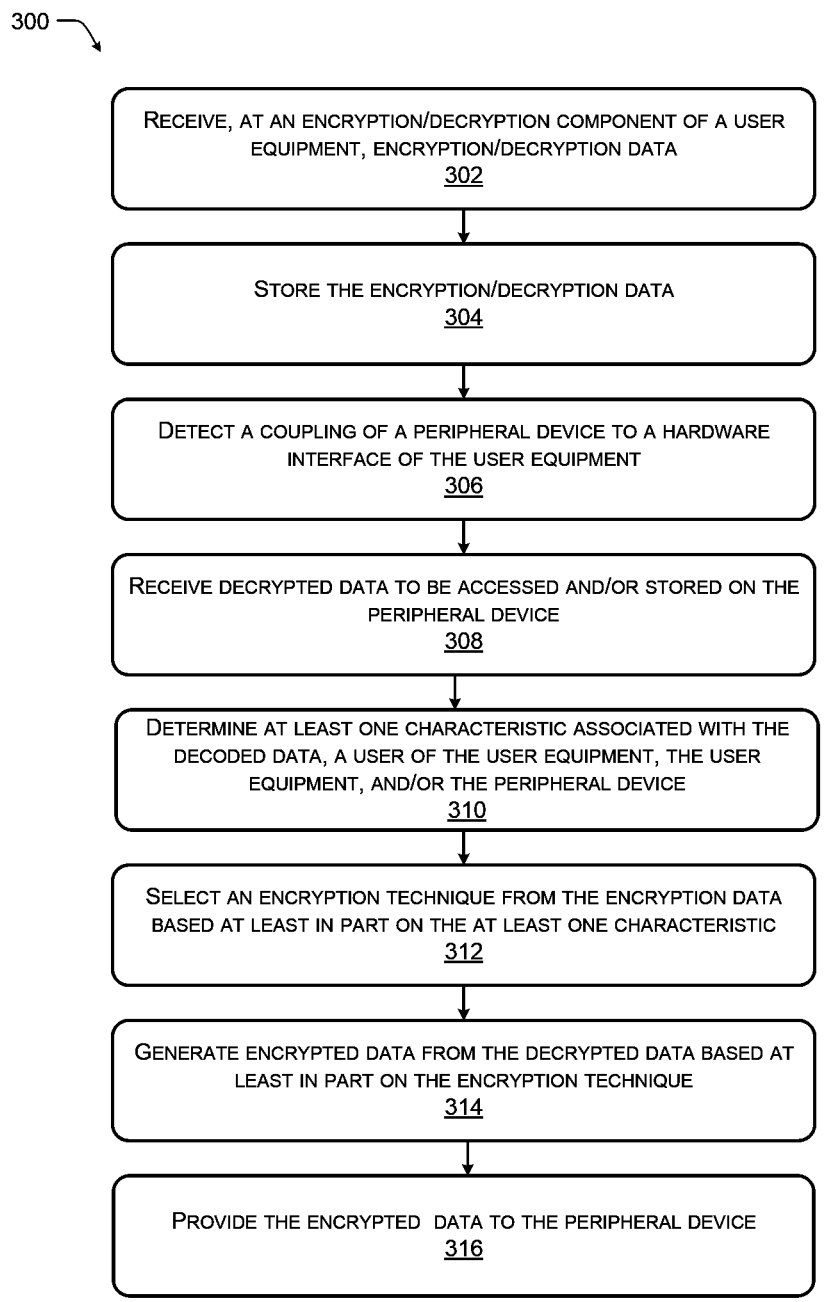
FIG. 3 illustrates an example flow diagram showing an illustrative process associated with the encryption/decryption component of FIGS. 1 and 2, in accordance with some examples of the present disclosure.
Figure 4:
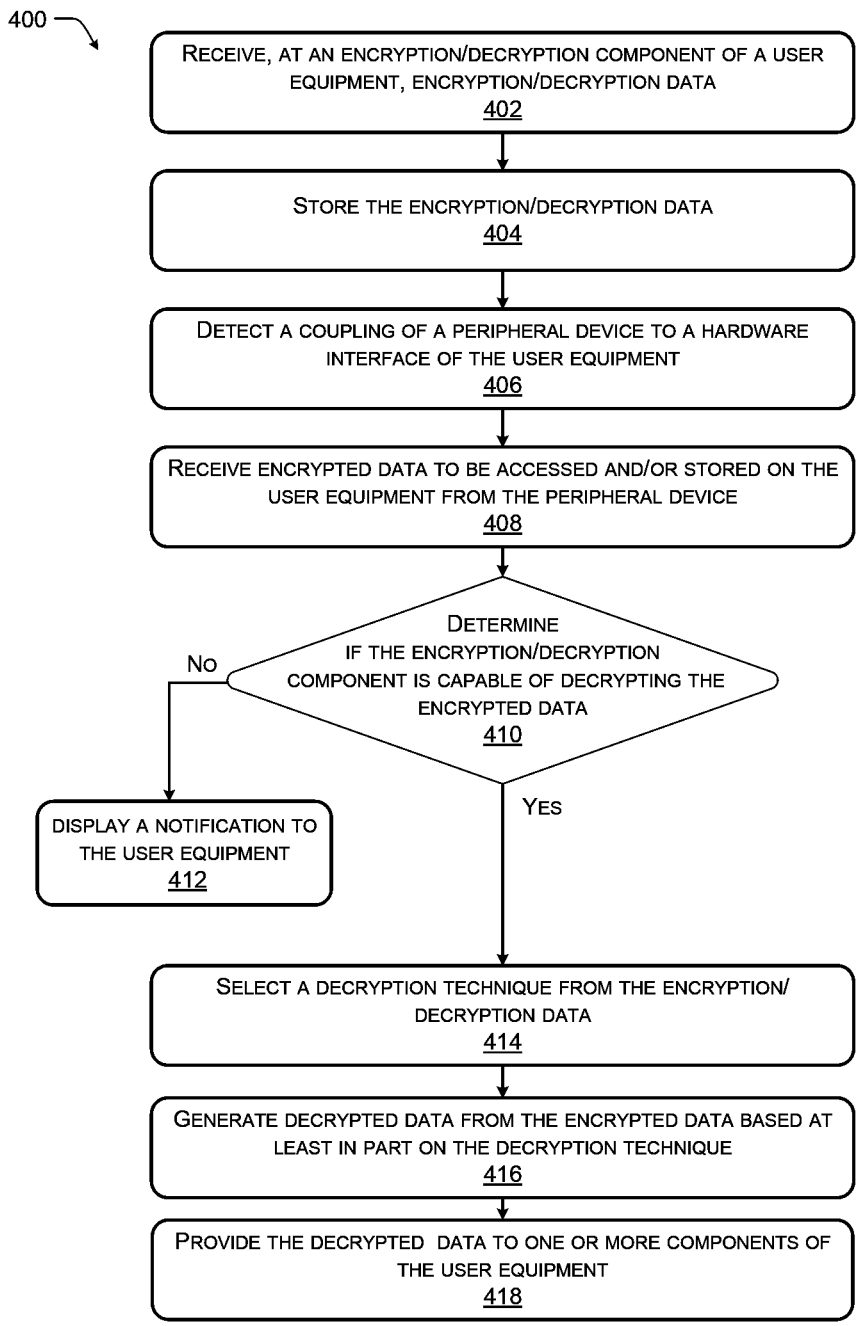
FIG. 4 illustrates another example flow diagram showing an illustrative process associated with the encryption/decryption component of FIGS. 1 and 2, in accordance with some examples of the present disclosure.

FIGS. 3-4 are flow diagrams illustrating example processes associated with the authentication component and system of FIG. 1 according to some implementations. The processes are illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 3 illustrates an example flow 300 diagram showing an illustrative process associated with the encryption/decryption component of FIGS. 1 and 2, in accordance with some examples of the present disclosure. As discussed above, an encryption/decryption component may be incorporated into the hardware of a user equipment between the hardware interfaces (such as the USB or mini USB) and the other components of the user equipment to encrypt any data downloaded from the user equipment onto the peripheral and to decrypt any data uploaded from the peripheral to the user equipment regardless of the intention of the current user. By preventing data from being downloaded/uploaded without encryption, the encryption/decryption component assists in preventing the unauthorized use, theft, or loss of sensitive and/or confidential data.

At 302, the encryption/decryption component of the user equipment may receive encryption/decryption data from a remote encryption/decryption system. In some cases, the encryption/decryption system may send the encryption/decryption data to the user equipment via a network, as discussed above with respect to FIG. 1. The encryption/decryption data may include encryption/decryption techniques, algorithms, keys and the like. In some case, the encryption/decryption data may include instructions for the encryption/decryption component to utilize specific encryption/decryption techniques, algorithms, keys, etc. based on characteristics of the data, current users of the user equipment, characteristics of the user equipment, and/or characteristics of the peripheral device. In some cases, the encryption/decryption component may request updates to the encryption/decryption data and/or the encryption/decryption system may push updates to the encryption/decryption data on various schedules such as ad hoc and/or periodic basis.

At 304, the encryption/decryption component may store the encryption/decryption data. For instance, the encryption/decryption component may include a dedicated memory that may be accessible to the encryption/decryption component to prevent tampering by users of the user equipment. In some cases, the encryption/decryption data may be compressed, encoded, or encrypted either prior to transmission by the encryption/decryption system or prior to storing by the encryption/decryption component.

At 306, the encryption/decryption component may detect a coupling of a peripheral device to the hardware interface of the user equipment. In some cases, the detecting may be a signal from the hardware interface to the encryption/decryption component. In other cases, the detecting may be via one or more sensors or components that detect the physical couplings, such as one or more pins, usable to detect the coupling.

At 308, the encryption/decryption component may receive decrypted data to be accessed and/or stored on the peripheral device. In some cases, the decrypted data may be received from a processor, memory, or other component of the user equipment.

At 310, the encryption/decryption component may determine at least one characteristic associated with the decrypted data, a user of the user equipment, the user equipment, and/or the peripheral device. For example, the encryption/decryption component may determine a type, a content, or subject matter associated with the decoded data, an identity, role, or authorization associated with the user of the user equipment, a location, status, or authorization of the user equipment, and/or a status or authorization of the peripheral device. In some cases, the encryption/decryption component may determine the characteristics based on metadata or may receive the characteristics from other components of the user equipment. It should also be understood that the encryption/decryption component may determine multiple characteristics of the decrypted data, a user of the user equipment, the user equipment, and/or the peripheral device.

At 312, the encryption/decryption component may select an encryption technique from the encryption data based at least in part on the at least one characteristic and, at 314 the encryption/decryption component may generate encrypted data from the decrypted data based at least in part on the encryption technique. For instance, the encryption/decryption component may apply different encryption techniques, algorithms, keys and the like based on the characteristics determined at 314. As an illustrated example, the encryption/decryption component may apply a first encryption/decryption technique to data associated with a marketing department a second encryption/decryption technique to data associated with customer data (such as credit cards, name, address, and the like). In another example, the encryption/decryption component may utilize a first encryption technique when the user equipment is in the secured location (such as the office) and a second encryption technique when the user is in a public setting (such as a coffee shop). In yet another example, the encryption/decryption component may apply a first encryption technique when the data includes text-based data and a second encryption technique when the data includes video data. In still another example, the encryption/decryption component may apply a first encryption technique when the peripheral is issued by the corporate entity and a second encryption technique when the peripheral is personal property.

At 316, the encryption/decryption component may provide the encrypted data to the peripheral device. For example, the encryption/decryption component may allow the peripheral to access the encrypted data and/or store the encrypted data.

FIG. 4 illustrates another example flow diagram showing an illustrative process 400 associated showing an illustrative process associated with the encryption/decryption component of FIGS. 1 and 2, in accordance with some examples of the present disclosure. As discussed above, the data stored on peripheral devices may be encrypted by an encryption/decryption component of a user equipment regardless of the intention of the user.

At 402, the encryption/decryption component of the user equipment may receive encryption/decryption data from a remote encryption/decryption system. As discussed above, the encryption/decryption data may include encryption/decryption techniques, algorithms, keys and the like. In some case, the encryption/decryption data may include instructions for the encryption/decryption component to utilize specific encryption/decryption techniques, algorithms, keys, etc. based on characteristics of the data, current users of the user equipment, characteristics of the user equipment, and/or characteristics of the peripheral device. In some cases, the encryption/decryption component may request updates to the encryption/decryption data and/or the encryption/decryption system may push updates to the encryption/decryption data on various schedules such as ad hoc and/or periodic basis.

At 404, the encryption/decryption component may store the encryption/decryption data. For instance, the encryption/decryption component may include a dedicated memory that may be accessible to the encryption/decryption component to prevent tampering by users of the user equipment. In some cases, the encryption/decryption data may be compressed, encoded, or encrypted either prior to transmission by the encryption/decryption system or prior to storing by the encryption/decryption component.

At 406, the encryption/decryption component may detect a coupling of a peripheral device to the hardware interface of the user equipment. In some cases, the detecting may be a signal from the hardware interface to the encryption/decryption component. In other cases, the detecting may be via one or more sensors or components that detect the physical couplings, such as one or more pins, usable to detect the coupling.

At 408, the encryption/decryption component may receive encrypted data to be accessed and/or stored on the user equipment from the peripheral device and, at 410, the encryption/decryption component may determine if the encryption/decryption component is capable of decrypting the encrypted data. For example, the encryption/decryption component may confirm that a status of the user and/or the user equipment indicates that the user is authorized to access the encrypted data. In another example, the encryption/decryption component may determine if any of the stored decryption techniques are capable of decrypting the encrypted data.

If, the encryption/decryption component determines that the encryption/decryption component is not capable of decrypting the encrypted data, the process 400 advances to 412. At 412, the encryption/decryption component may cause the user equipment to send or display a notification to a user indicating that the user and/or the user equipment is not authorized to access the encrypted data. In some cases, the notification may include instructions on how the user may be able to obtain authorization to decrypt the data, such as by contacting the user's IT representative.

If, however, the encryption/decryption component determines that the encryption/decryption component is capable of decrypting the encrypted data, the process 400 advances to 414. At 414, the encryption/decryption component may select a decryption technique from the encryption/decryption data. For example, the encryption/decryption component may select the decryption technique based on the encryption technique applied when the encrypted data was downloaded to the peripheral device.

At 416, the encryption/decryption component may generate decrypted data from the encrypted data based at least in part on the decryption technique. For example, the encryption/decryption component may decrypt, decode, decompress, and the like the encrypted data such that the data is usable by the other components of the user equipment (e.g., the processors, memories, etc.).

At 418, the encryption/decryption component may provide the decrypted data to one or more components of the user equipment. For example, the encryption/decryption component may provide the decrypted data to a processor and/or a memory of the user equipment. In some cases, the decrypted data may be presented to the user on, for instance, a display associated with the user equipment.

Figure 5:
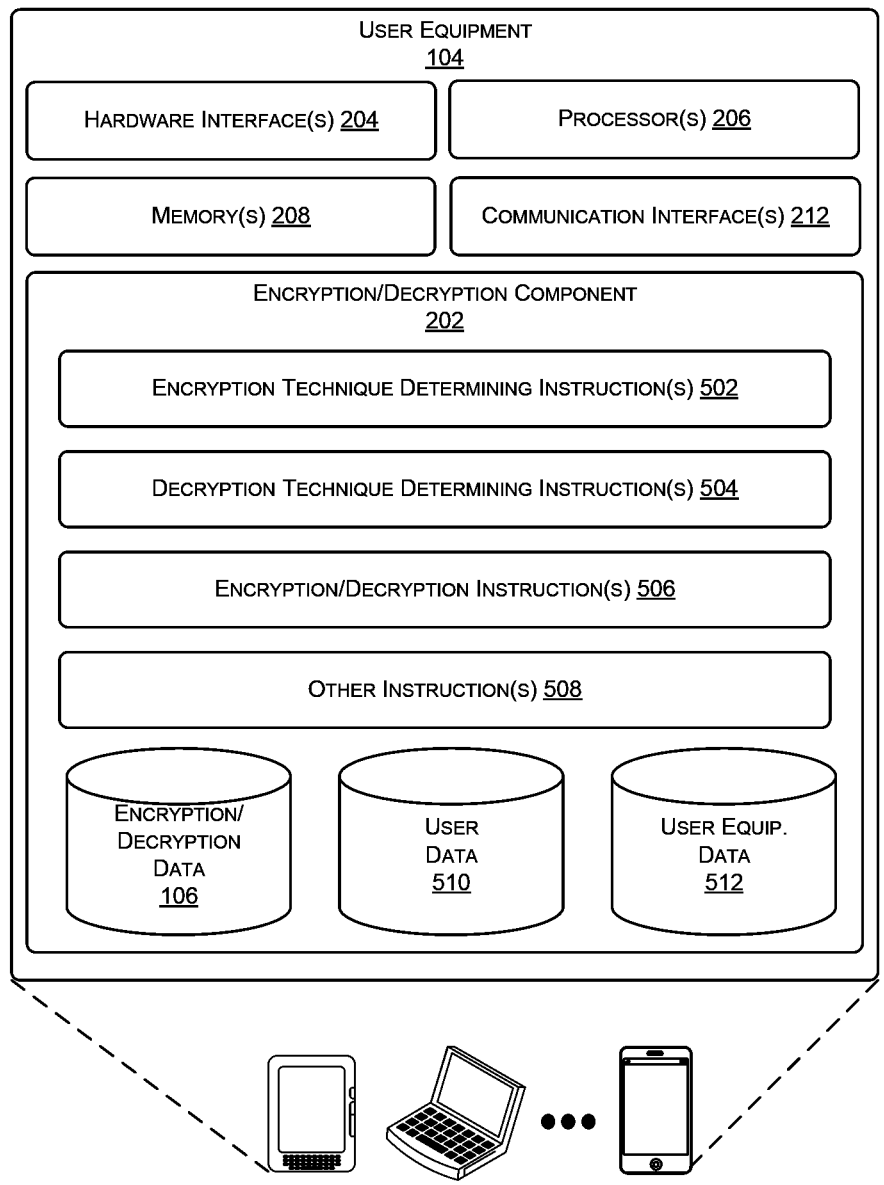
FIG. 5 illustrates an example hardware associated with the user equipment equipped with an authorization component, in accordance with some examples of the present disclosure.

FIG. 5 illustrates an example hardware associated with a user equipment 104 equipped with an encryption/decryption component 202, in accordance with some examples of the present disclosure. As discussed above, an encryption/decryption component 202 may be incorporated into the hardware of a user equipment 104 between the hardware interface 204 and the other components of the user equipment 104, such as the processors 206 and the memories 208. In some case, the encryption/decryption component 202 may provide an interface to encrypt and decrypt data being downloaded and uploaded, respectively, between the user equipment 104 and a peripheral device. In this manner, a user is unable to download or remove unencrypted data from the user equipment 106.

In some implementations, the communication interfaces 212 configured to facilitate communication between one or more networks, one or more cloud-based systems, and/or one or more devices, such as encryption/decryption data 106, as discussed above. In other examples, the communication interfaces 212 may also facilitate communication between one or more cellular or mobile communication networks, such as the corporate network. In some cases, the communication interfaces 212 may support both wired and wireless connection to various networks, such as cellular networks, radio, WiFi networks, infrared signals, local area networks, wide area networks, the Internet, and so forth. In one implementation, the communication interfaces 212 may be configured to receive encryption/decryption data 106 from the encryption/decryption system and provide the encryption/decryption data 106 to the encryption/decryption component 202.

In some implementations, the hardware interface 204 may include various types of interfaces and/or pins that may couple to external devices or peripherals that may be used in conjunction with the user equipment 104 by a user. In some instances, the hardware interface 204 may include USB interfaces, mini USB interfaces, serial input interfaces, parallel input interfaces, HDMI interfaces, digital visual interfaces (DVI), display port (DP) interfaces, tip-sleeve-ring interfaces, video graphics array (VGA) interfaces, and any other types of data, audio, and/or video interfaces.

The processor(s) 206 can represent, for example, a central processing unit (CPU)-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc. In various embodiments, the processor(s) 206 can execute one or more modules, instructions sets, and/or processes to cause the user equipment 104 to perform a variety of functionalities. Additionally, each of the processor(s) 206 may possess its own local memory, which also can store program modules, program data, and/or one or more operating systems.

Depending on the exact configuration and type of the user equipment 104, the memories 208, may include computer readable media, computer storage media, and/or communication media. Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data.

Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile discs (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In at least one example, the memories 208 can include non-transitory computer-readable media. Non-transitory computer-readable media can include volatile and nonvolatile, removable and non-removable tangible, physical media implemented in technology for storage of information, such as computer readable instructions, data structures, program modules, or other data. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information. Any such non-transitory computer-readable media can be part of the user equipment 104.

In the current example, the encryption/decryption component 202 may include and/or store one or more modules and data structures including, for example, encryption technique determining instructions 502, decryption technique determining instructions 504, encryption/decryption instructions 506, as well as other instructions 508.

The one or more modules, instruction sets, and data structures can be in the form of stand-alone applications, productivity applications, an operating system component, or any other application or software module configured to perform operations as described herein. The authorization component 202 may also store data, such as encryption/decryption data 106 received from one or more encryption/decryption systems, user data 510 associated with one or more authorized users of the user equipment 104, and/or user equipment data 512.

In some implementations, the encryption/decryption component 202 may be implemented in hardware. In other implementations, the encryption/decryption component 202 may include one or more dedicated processors and/or memories to store and cause the authorization component 202 to perform the operations associated with the encryption technique determining instructions 502, the decryption technique determining instructions 504, the encryption/decryption instructions 506 as well as to store the encryption/decryption data 106, the user data 510, and the user equipment data 512.

Similar to processors 206, the processors of the encryption/decryption component 202 may represent, for example, a CPU-type processing unit, a FPGA, DSP, or other hardware logic components that can, in some instances, be driven by a CPU. Likewise, the memories of the encryption/decryption component 202 may be similar to the memories 208 and may include computer readable media, computer storage media, and/or communication media. Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media and/or any storage medium that can be used to store and maintain information for access by a computing device.

The encryption/decryption data 106 may include techniques, algorithms, keys, codes, and the like that may be used to encrypt, decrypt, encode, decode, compress, and/or decompress data received and sent to peripheral devices coupled to the hardware interfaces 204. In some cases, the encryption/decryption data 106 may also include selection instructions to assist the encryption/decryption component 202 in selecting appropriate compression techniques respective to the data, the user, the user equipment, and/or the peripheral device. In some cases, the encryption/decryption data 106 may be encrypted, compressed or otherwise encoded when stored on the user equipment 104.

The user data 510 may include information associated with each user of the user equipment 104. In some cases, the user data 510 may include a mapping or table that associates the encryption/decryption data 106 with each authorized user of the user equipment 104. For instance, in some cases, the user equipment 104 may be a shared resource and different users may be associated with different authorizations or access levels, different peripheral devices, and the like. In this example, the user data 510 may be used by the encryption technique determining instructions 504 and/or the decryption technique determining instructions 506 when encrypting and decrypting data passing to and from peripheral devices coupled to the hardware interface 204.

The user equipment data 512 may include information associated with the user equipment 104. For instance, the user equipment 104 may be assigned to particular departments, may be assigned specific access levels or classes, or otherwise have a limited set of approved peripheral devices. Thus, the user equipment data 512 may also include restrictions on the encryption/decryption data 106 imposed by the characteristics or assigned traits of the user equipment 104. In some cases, the user equipment data 512 may be used by the encryption technique determining instructions 504 and/or the decryption technique determining instructions 506 when encrypting and decrypting data passing to and from peripheral devices coupled to the hardware interface 204.

The encryption technique determining instructions 502 may be configured to detect that a user is attempting to download data from user equipment 104 onto a peripheral device coupled to the hardware interface 204. In some cases, the encryption technique determining instructions 502 may analyze the data itself (e.g., for type and content), determine a current user of the user equipment 104 (e.g., an active or logged in account), determine a status or authorization of the user equipment 104 itself and the like prior to selecting or determining an encryption technique. Thus, in some implementations, the encryption technique determining instructions 502 may also determine the encryption technique based at least in part on the encryption/decryption data 106, the user data 510, the user equipment data 512 as well as data received from or determined about the peripheral device coupled to the hardware interface 204 and accessing the data.

For instance, in one example, the encryption technique determining instructions 502 may determine an appropriate encryption technique (e.g., key, code, algorithm, seed value, etc.) based at least in part on characteristics of the data, the user, the user equipment 104, and/or the peripheral device as well as the encryption/decryption data 106 received from the encryption/decrypting system as discussed with respect to FIG. 1. For example, the encryption/decryption data 106 may indicate an appropriate encryption technique based on the determined characteristics of the data, the user, the user equipment 104, and/or the peripheral device.

It should be understood, that the encryption technique determining instructions 502 may select different encryption techniques per user, per user equipment 104, per download (e.g., based on the data) and/or based on combinations of the above. Thus, different data may be encrypted using different technique and the techniques are not selectable by the user but by the encryption technique determining instructions 502 of the encryption/decryption component 202 based on the encryption/decryption data 106 received from the encryption/decryption system.

The decryption technique determining instructions 504 may be configured to detect that a user is attempting to upload data from user equipment 104 from a peripheral device coupled to the hardware interface 204. In some cases, the decryption technique determining instructions 504 may receive an indication of the encryption from the peripheral device or as part of the encrypted data. In other cases, the decryption technique determining instructions 504 may determine the decryption technique based at least in part on the encryption/decryption data 106, the user data 510, the user equipment data 512 as well as data received from or determined about the peripheral device coupled to the hardware interface 204 and uploading the data.

For instance, in one example, the decryption technique determining instructions 504 may determine an appropriate decryption technique (e.g., key, code, algorithm, seed value, etc.) based at least in part on characteristics of the encrypted data, the user, the user equipment 104, and/or the peripheral device as well as the encryption/decryption data 106 received from the encryption/decrypting system as discussed with respect to FIG. 1. For example, the encryption/decryption data 106 may indicate an appropriate decryption technique based on the determined characteristics of the data, the user, the user equipment 104, and/or the peripheral device.

The encryption/decryption instructions 506 may be configured to apply the selected encryption technique to data being downloaded onto the peripheral device and the selected decryption technique to data being uploaded from the peripheral device. In some cases, the encryption/decryption instructions 506 may be configured to notify the user of the device, such as via a notification presented on a display of the user equipment 104, if the encryption/decryption instructions 506 is unable to either encrypt or decrypt the data. In some cases, the notification may include instructions on attempting to update the encryption/decryption data 106 stored on the user equipment 104 or other methods of obtaining the correct permissions/authorizations to encrypt and/or decrypt the data.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method performed by an encryption/decryption component of a user equipment, the method comprising:
    receiving encryption/decryption data from an encryption/decryption system in response to the user equipment connecting to the encryption/decryption system including, each time the user equipment is connected to the encryption/decryption system, receiving new encryption/decryption data different from previous encryption/decryption data;
storing the encryption/decryption data in a dedicated memory of the encryption/decryption component accessible by the encryption/decryption component and inaccessible by one or more other components of the user equipment, the encryption/decryption data including a plurality of encryption/decryption schemes;
detecting a coupling of a peripheral device to a hardware interface of the user equipment;
detecting a first request from the user equipment to write first data to the peripheral device;
determining that the first data includes a first content belonging to a first type and a second content belonging to a second type different from the first type;
selecting from the plurality of encryption/decryption schemes:
a first encryption scheme for the first content, and
a second encryption scheme for the second content, the second encryption scheme different from the first encryption scheme;
encrypting:
the first content using the first encryption scheme, and
the second content using the second encryption scheme; and
after encrypting the first content and the second content, writing the encrypted first content and the encrypted second content to the peripheral device,
wherein the first type and the second type include:
respective departments to which the first content and the second content belong, and
respective encryption levels for the first content and the second content.

2. The method as claim 1 recites, wherein selecting the first encryption scheme is further based at least in part on data associated with an active user associated of the user equipment.

3. The method as claim 1 recites, further comprising:
detecting a request from the user equipment to read second data from the peripheral device;
decrypting the second data using the first encryption scheme; and
providing the second data to the user equipment.

4. The method as claim 1 recites,
wherein the first request to write the first data to the peripheral device includes a designation of the second encryption scheme.

5. The method as claim 1 recites, further comprising:
detecting a subsequent coupling of the peripheral device to a hardware interface of a different user equipment;
detecting a second request from the peripheral device to write second data to the different user equipment;
selecting a decryption scheme based at least in part on the second data to be written to the user equipment;
determining that the second data cannot be decrypted using the decryption scheme; and
presenting a notification on a display of the user equipment, the notification indicating that a user of the user equipment is not authorized to access the second data and including instructions for the user to obtain authorization.

6. The method as claim 1 recites, wherein selecting, from the plurality of encryption/decryption schemes, the first encryption scheme and the second encryption scheme is further based on metadata associated with the first data.

7. The method as claim 1 recites, further comprising:
based at least in part on determining that a status of the user has changed, deleting, by the encryption/decryption component, the first data from the peripheral device including deleting one or more decryption keys associated with the user.

8. The method as claim 1 recites, wherein determining that the first data includes the first content belonging to the first type and the second content belonging to the second type different from the first type further includes:
determining a first level of encryption for the first content, and
determining a second level of encryption for the second content.

9. The method as recited in claim 8, wherein:
selecting the first encryption scheme includes selecting the first encryption scheme based on the first level of encryption, and
selecting the second encryption scheme includes selecting the second encryption scheme based the second level of encryption.

10. The method as claim 9 recites, wherein the first encryption scheme provides a higher level of encryption than the second encryption scheme.

11. A system comprising:
a communication interface;
a hardware interface for physically coupling to a peripheral device;
one or more processors;
an encryption/decryption component coupled between the hardware interface and the one or more processors and the communication interface, the encryption/decryption component configured to perform operations including:
receiving, via the communication interface, encryption/decryption data from a remote system in response to the system connecting to the remote system including, each time the system is connected to the remote system, receiving new encryption/decryption data different from previous encryption/decryption data;
storing the encryption/decryption data in a dedicated memory of the encryption/decryption component accessible by the encryption/decryption component and inaccessible by one or more other components of system, the encryption/decryption data including a plurality of encryption/decryption techniques;
detecting a physical coupling of a peripheral device to the hardware interface;
detecting a request from a component of the system to write first data to the peripheral device;
determining that the first data includes a first content belonging to a first type and a second content belonging to a second type different from the first type;
selecting from the plurality of encryption/decryption techniques:
a first encryption technique for the first content, and
a second encryption technique for the second content, the second encryption technique different from the first encryption technique;
encrypting:
the first content using the first encryption technique, and
the second content using the second encryption technique; and
after encrypting the first content and the second content, writing the encrypted first content and the encrypted second content to the peripheral device, wherein the first type and the second type include:
respective departments to which the first content and the second content belong, and
respective encryption levels for the first content and the second content.

12. The system as recited in claim 11, wherein selecting the first encryption technique from the plurality of encryption/decryption techniques is further based at least in part on a location of the system.

13. The system as recited in claim 11, wherein the operations further comprise:
detecting a subsequent request from the peripheral device to write second data to the system;
selecting a first decryption technique from the plurality of encryption/decryption techniques based at least in part on the second data to be written to the system;
determining that the second data cannot be decrypted using the first decryption technique; and
presenting a notification on a display of the system, the notification indicating that a user of the system is not authorized to access the second data.

14. The system as recited in claim 13, wherein the notification includes instructions for the user to request authorization to access the second data.

15. A component of a user equipment comprising:
one or more processors;
a non-transitory computer-readable media accessible to the one or more processors, the non-transitory computer-readable media storing computer-executable instructions, which when executed by the one or more processors cause the one or more processors to perform operations including:
receiving encryption/decryption data from an encryption/decryption system in response to the user equipment connecting to the encryption/decryption system including, each time the user equipment is connected to the encryption/decryption system, receiving new encryption/decryption data different from previous encryption/decryption data;
storing the encryption/decryption data in a dedicated memory of the component accessible by the component and inaccessible by one or more other components of the user equipment, the encryption/decryption data including a plurality of encryption schemes and a plurality of decryption schemes;
detecting a physical coupling of a peripheral device to a hardware interface of the user equipment;
receiving a first request, from the peripheral device, to access first data stored on the user equipment;
determining that the first data includes a first content belonging to a first type and a second content belonging to a second type different from the first type;
selecting, from the plurality of encryption schemes:
a first encryption scheme for the first content, and
a second encryption scheme for the second content;
encrypting:
the first content using the first encryption scheme, and
the second content using the second encryption scheme;
generating first encrypted data from the first data based at least in part on the encrypted first content and the encrypted second content; and
allowing the peripheral device to access the first encrypted data,
wherein the first type and the second type include:
respective departments to which the first content and the second content belong, and
respective encryption levels for the first content and the second content.

16. The component as recited in claim 15, wherein individual encryption schemes of the plurality of encryption schemes include a designated encryption algorithm and a seed value.

17. The component as recited in claim 15, wherein the operations further include, prior to receiving the first request from the peripheral device, determining the peripheral device is authorized to access the user equipment.

18. The component as recited in claim 15, wherein selecting the first encryption scheme and the second encryption scheme from the plurality of encryption schemes is further based at least in part on one or more of:
characteristics associated with a user of the user equipment; or
characteristics associated with the user equipment.

19. The component as recited in claim 15, wherein the operations further include:
detecting a second request from the peripheral device to write second data to the user equipment;
selecting a decryption scheme from the plurality of decryption schemes based at least in part on characteristics of the peripheral device;
determining that the second data cannot be decrypted using the decryption scheme; and
presenting a notification on a display of the user equipment, the notification indicating that user equipment is unable to access the second data.

* * * * *